Patented May 13, 1952

UNITED STATES PATENT OFFICE 2,596,497

PROCESS OF STRENGTHENING A CALCINED SUPPORTED PHOSPHORIC ACID CATALYST

Julian M. Mavity, Hinsdale, Ill., assignor to Universal Oil Products Company, Chicago, Ill., a corporation of Delaware No Drawing. Application October 13, 1949, Serial No. 121,231

18 Claims. (Cl. 252—432)

This invention relates to the manufacture of catalysts useful in accelerating various types of reactions among organic compounds. In a more specific sense, the invention is concerned with the production of a particular type of solid catalyst which has special properties both in regard to its activity in accelerating and directing olefine polymerization reactions, its stability in service, and in its relatively low corrosive properties when employed in ordinary commercial apparatus comprising various types of steel.

An object of this invention is a method of producing a hydrocarbon conversion catalyst which has a high resistance to crushing during use.

Another object of this invention is a highly active catalyst suitable for use in the polymerization of olefinic hydrocarbons and in other hydrocarbon conversion reactions involving olefins.

One specific embodiment of this invention relates to a process which comprises treating a calcined composite of a phosphoric acid and a carrier with a volatile compound of an element selected from group III of the periodic table to form a solid catalytic material of greater structural strength than said calcined composite.

Another embodiment of this invention relates to a process which comprises treating a calcined composite of a phosphoric acid and a siliceous carrier with a volatile compound of an element selected from group III of the periodic table to form a solid catalytic material of greater structural strength than said calcined composite.

A further embodiment of this invention relates to a process which comprises treating a calcined composite of a polyphosphoric acid and diatomaceous earth with a volatile compound of an element selected from group III of the periodic table to form a solid catalytic material of greater structural strength than said calcined composite.

An additional embodiment of this invention relates to a process which comprises treating a calcined composite of a polyphosphoric acid and diatomaceous earth with an organo aluminum compound to form a solid catalytic material of greater structural strength.

A still further embodiment of this invention relates to a process which comprises treating a calcined composite of pyrophosphoric acid and diatomaceous earth with an ethyl aluminum bromide to form a solid catalytic material of greater structural strength than said calcined composite.

Still another embodiment of this invention relates to a process which comprises treating a calcined composite of pyrophosphoric acid and diatomaceous earth with an aluminum trialkyl to form a solid catalytic material of greater structural strength than said calcined composite.

An additional embodiment of this invention relates to a process which comprises treating a calcined composite of pyrophosphoric acid and diatomaceous earth with a volatile aluminum trihalide to form a solid catalytic material of greater structural strength than said calcined composite.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be procured although the invention is not restricted to their use but may employ any of the other acids of phosphorus insofar as they are adaptable. It is not intended to infer, however, that the different acids of phosphorus, which may be employed will produce catalysts which have identical effects upon any given organic reaction as each of the catalysts produced from different acids and by slightly varied procedure will exert its own characteristic action.

When orthophosphoric acid is used as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the ortho-phosphoric acid. Within these concentration ranges, the acids will be liquids of varying viscosities, and readily mixed with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixture or to mixtures of other polyphosphoric acids and siliceous adsorbents may be different from that useful when the ortho acid is so employed.

Triphosphoric acid which may be represented by the formula $H_5P_3O_{10}$ may also be used as a starting material for preparation of the catalysts of this invention. These catalytic compositions may also be prepared from the siliceous materials mentioned herein and a phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O.2P_2O_5$ which in turn may be considered as the acid resulting when three molecules of water are lost by four molecules of orthophosphoric acid, $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperatures, the crystals of the tetraphosphoric acid separate from the viscous liquid and it is found that these crystals melt at approximately 93° F. and have a specific gravity of 1.1886 at a temperature of 60° F. However, it is unnecessary to crystallize the tetraphosphoric acid before employing it in the preparation of the solid catalysts inasmuch as the crude tetraphosphoric acid mixture may be incorporated with the siliceous adsorbent and other catalyst ingredient.

The materials which may be employed as adsorbents or carriers for acids of phosphorus include siliceous adsorbents such as diatomaceous earth, kieselguhr, artifically prepared silica, and also certain aluminum silicates which include such naturally occurring substances as various fuller's earths, clays, such as bentonite, montmorillonite, acid treated clays, also refractory oxides, carbon, and similar materials. Each adsorbent or supporting material which may be used will exert its own specific influence upon the final catalyst composite formed in the process.

Volatile compounds of elements selected from group III of the periodic table which are employed for treating the calcined composites of phosphoric acid and a carrier to improve the structural strength of said composite include particularly volatile compounds of aluminum and boron. The volatile compounds of aluminum include alkyl aluminum halides, aluminum trialkyls, and the volatile aluminum halides, particularly aluminum bromide and aluminum chloride. Compounds of boron adaptable to this use include boron trifluoride and boron trichloride.

The treatment of a calcined composite of a phosphoric acid and a carrier with one or more volatile compounds of an element of group III of the periodic table may be carried out by one of the following methods:

(1) The calcined composite may be maintained at a temperature of from about 100° to about 550° C. and contacted with vapors of said volatile compound or with a mixture of vapors of a substantially inert solvent and a volatile compound of an element of group III of the periodic table.

(2) The calcined composite of phosphoric acid and a carrier may also be treated with a solution of the volatile compound of group III of the periodic table dissolved in a suitable solvent such as a low-boiling saturated hydrocarbon, an ether, or another relatively low-boiling organic liquid free from hydroxyl groups.

During this treatment of a calcined composite of a phosphoric acid and a carrier with a volatile compound of an element of group III of the periodic table, the amount of said volatile compound is controlled so that the resultant treated phosphoric acid containing catalyst will contain from about 1 to about 10% by weight of a phosphate of an element of group III of the periodic table so added in the form of the volatile compound which reacts readily with part of the free phosphoric acid content of the solid catalyst forming the phosphate and thus increasing the structural strength of the treated catalyst.

Composites of a phosphoric acid and a carrier are prepared by mixing the phosphoric acid with the finely divided relatively inert carrier generally at a temperature of from about 20° to about 250° C. to form an aggregate in which the phosphoric acid is ordinarily the major proportion by weight. The resultant aggregate is a slightly moist to almost dry material which upon being compressed becomes sufficiently plastic that it can be extruded and formed into shaped particles. The resultant particles are then dried, and calcined at a temperature of from about 100° to about 550° C. for a time of from about 0.25 to about 10 hours to form a substantially solid material. The calcining operation may be carried out by heating the formed particles in a substantially inert gas such as air, nitrogen, flue gas, and the like. These calcined particles are then treated with a volatile compound of an element selected from the metals of group III of the periodic table.

A calcined composite of an acid of phosphorus and a carrier is treated with vapors of a volatile compound of an element of group III as hereinabove set forth or with a mixture of vapors of said compound of a group III element and a substantially inert diluent gas or vapor. Alternatively, the particles of the calcined composite of a phosphoric acid and a carrier may be mixed with or soaked in a solution of a volatile compound of an element of group III dissolved in a suitable solvent such as a low-boiling saturated hydrocarbon, an ether, or another relatively low-boiling organic liquid free from hydroxyl groups. The treated composites may then be separated from the excess treating solution by decanting said solution therefrom after which the catalyst particles wetted with the solution of the volatile compound of an element of group III may be heated in an inert atmosphere to remove excess solvent to form a solid catalytic material with a structural strength greater than that of the calcined composite of a phosphoric acid and carrier which was subjected to this treating step with the volatile compound of aluminum, boron and the like.

Calcined composites of a phosphoric acid and a carrier, particularly a siliceous carrier, which had been treated as herein set forth with a volatile compound of an element selected from group III of the periodic table are active for promoting polymerization of olefinic hydrocarbons, particularly for promoting polymerization of normally gaseous olefinic hydrocarbons to form normally liquid hydrocarbons suitable for use as constituents of gasoline. When employed in the conversion of olefinic hydrocarbons into polymers, the calcined catalyst formed as herein set forth, is preferably employed as a granular layer in a heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions, suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin-containing gas mixture is passed downwardly therethrough at a temperature of from about 360° to about 550° F. and at a pressure of 100 to about 1500 pounds per square inch when dealing with olefin-containing materials such as stabilizer reflux which may contain from approximately 10 to 50% or more of propylene and butylenes. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

In utilizing the catalysts of this invention for promoting miscellaneous organic reactions, the catalysts may be employed in essentially the same way as they are used when polymerizing olefins, in case the reactions are essentially vapor phase, and they may also be employed in suspension in liquid phase in various types of equipment.

With suitable modifications in the details of operation, the present type of catalyst may be employed in a large number of organic reactions including polymerization of olefins as already mentioned. Typical cases of reaction in which the present type of catalyst may be used are the alkylation of cyclic compounds with olefins, the cyclic compounds including aromatics, polycyclic compounds, naphthenes and phenols; condensation reactions such as those occurring between ethers and aromatics, alcohols and aromatics, phenols and aldehydes, etc.; reactions involving the hydro-halogenation of unsaturated organic compounds, isomerization reactions, ester formation by the interaction of carboxylic acids and olefins, and the like. The specific procedure for utilizing the present type of catalysts in miscellaneous organic reactions will be determined by the chemical and physical characteristics and the phase of the reacting constituents.

During use of these catalysts in vapor phase polymerizations and other vapor phase treatments of organic compounds, it is often advisable to add small amounts of moisture to prevent excessive dehydration and subsequent decrease in catalyst activities. In order to substantially prevent loss of water from the catalyst an amount of water or water vapor such as steam is added to the charged olefin-containing gas so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose their activities during polymerization use and also suffer a marked decrease in crushing strength due to the softening of the catalyst. Such softening of the catalyst also results in short catalyst life inasmuch as the catalyst towers become plugged during use. In this process, I have found that catalysts of high crushing strengths may be produced by adding to the composite of phosphoric acid and diatomaceous earth an amount of a volatile compound of an element selected from the metals of group III of the periodic table so that from about 1 to about 10% by weight (based upon the weight of total catalyst) of a phosphate of the group III element is formed in the final catalyst composite. Such a catalyst composite which has been treated with a volatile compound of an element of group III of the periodic table also has a good crushing strength after it has been used in the polymerization reaction.

The following examples of the preparation of catalysts comprised within the scope of this invention and the results obtained in their use for catalyzing the polymerization of propylene are characteristic, although the exact details set forth in these examples are not to be construed as imposing undue limitations upon the generally broad scope of the invention.

The table shows comparative results obtained in autoclave tests on polymerization catalysts prepared from polyphosphoric acid, diatomaceous earth, and small amounts of ethyl aluminum sequibromide by the method set forth above. These catalyst activity tests were carried out by placing 10 grams of 5 x 5 mm. pellets of catalyst and 100 grams of a propane-propylene mixture (50–55% propylene content) in a rotatable steel autoclave of 850 cc. capacity which was then rotated at a temperature of 450° F. for two hours. At the end of this time, determinations were made to indicate the percentage conversion of propylene into liquid polymers.

TABLE

*Propylene polymerizing activities and crushing strengths of catalysts formed by treating a calcined composite of polyphosphoric acid and diatomaceous earth with ethyl aluminum bromide*

Test conditions: 10 grams catalyst pellets, 100 grams propane-propylene mixtures containing 53.3% propylene maintained for two hours at a temperature of 230° C. in a rotating autoclave of 850 cc. capacity

| Run No. | Materials added to calcined composite of polyphosphoric acid and diatomaceous earth | Calcination | | Per cent Conv. Propylene | Crushing strength, lbs. | |
|---|---|---|---|---|---|---|
| | | ° F. | Hours | | Before Use | After Use |
| 1 | Ethyl aluminum sesquibromide [1]. | 680 | 1 | 64.2 | 18.2 | 10.7 |
| 2 | Ethyl aluminum sesquibromide [1]. | 860 | 1 | 43.4 | 17.7 | 10.9 |
| 3 | None | 680 | 1 | 66.5 | 11.4 | 5.4 |
| 4 | ------do------ | 860 | 1 | 48.5 | 16.0 | 9.1 |

[1] Aluminum used was 1.11% by weight of the original catalyst.

Comparison of the results obtained on the polymerizing activities and crushing strength of the calcined composite of orthophosphoric acid and diatomaceous earth with the results obtained on the same composited catalyst after treatment with ethyl aluminum sesquibromide showed a marked improvement in crushing strength both before and after use in the polymerization of propylene.

I claim as my invention:

1. A process for increasing the structural strength of a calcined composite of a phosphoric acid and a solid supporting material which comprises treating said composite with a compound of an element selected from the group consisting of aluminum and boron, said compound being reactable with free phosphoric acid in the composite to form a phosphate of said element and being in sufficient amount to add from about 1% to about 10% by weight of said phosphate to the composite, and calcining the thus treated composite.

2. A solid catalytic material formed by treating a precalcined composite of a phosphoric acid and a solid supporting material with a compound of an element selected from the group consisting of aluminum and boron, said compound being reactable with free phosphoric acid in the composite to form a phosphate of said element and being in sufficient amount to add from about 1% to about 10% by weight of said phosphate to the composite, and calcining the thus treated composite.

3. A process which comprises treating a calcined composite of a phosphoric acid and a solid supporting material with an alkyl aluminum halide in an amount sufficient to add from about 1 to about 10% by weight of aluminum phosphate to said calcined composite, and further calcining the resultant composite at a temperature of from about 100° C. to about 550° C. to form a solid catalytic material of greater structural strength than that of the original calcined composite of phosphoric acid and solid supporting material.

4. The process of claim 3 further characterized in that said alkyl aluminum halide is ethyl aluminum sesquibromide.

5. A process which comprises treating a calcined composite of a phosphoric acid and a siliceous carrier with an alkyl aluminum halide in an amount sufficient to add from about 1 to about 10% by weight of aluminum phosphate to said calcined composite, and further calcining the resultant composite at a temperature of from about 100° C. to about 550° C. to form a solid catalytic material of greater structural strength than that of the original calcined composite of phosphoric acid and siliceous carrier.

6. A process which comprises treating a calcined composite of a polyphosphoric acid and diatomaceous earth with an amount of an alkyl aluminum halide sufficient to add from about 1 to about 10% by weight of aluminum phosphate to said calcined composite, and further calcining the resultant composite at a temperature of from about 100° to about 550° C. to form a solid catalytic material of greater structural strength than that of the original calcined composite of polyphosphoric acid and diatomaceous earth.

7. A process which comprises treating a calcined composite of pyrophosphoric acid and diatomaceous earth with an amount of an ethyl aluminum bromide sufficient to add from about 1 to about 10% by weight of aluminum phosphate to said calcined composite, and further calcining the resultant composite at a temperature of from about 100° C. to about 550° C. to form a solid catalytic material of greater structural strength than that of the original calcined composite of pyrophosphoric acid and diatomaceous earth.

8. A process which comprises treating a calcined composite of pyrophosphoric acid and diatomaceous earth with an amount of an aluminum trialkyl sufficient to add from about 1 to about 10% by weight of aluminum phosphate to said calcined composite, and further calcining the resultant composite at a temperature of from about 100° C. to about 550° C. to form a solid catalytic material of greater structural strength than that of the original calcined composite of pyrophosphoric acid and diatomaceous earth.

9. A process which comprises treating a calcined composite of pyrophosphoric acid and diatomaceous earth with an amount of an aluminum trihalide sufficient to add from about 1 to about 10% by weight of aluminum phosphate to said calcined composite, and further calcining the resultant composite at a temperature of from about 100° C. to about 550° C. to form a solid catalytic material of greater structural strength than that of the original calcined composite of pyrophosphoric acid and diatomaceous earth.

10. A process which comprises treating a calcined composite of a polyphosphoric acid and diatomaceous earth with an amount of an alkyl aluminum halide sufficient to add from about 1 to about 10% by weight of aluminum phosphate to said calcined composite, and further calcining the resultant composite at a temperature of from about 100° to about 550° C. for a time of from about 0.25 to about 10 hours, to form a solid catalytic material of greater structural strength than that of the original calcined composite of polyphosphoric acid and diatomaceous earth.

11. A process which comprises treating a calcined composite of pyrophosphoric acid and diatomaceous earth with an amount of an ethyl aluminum bromide sufficient to add from about 1 to about 10% by weight of aluminum phosphate to said calcined composite, and further calcining the resultant composite at a temperature of from about 100° C. to about 550° C. for a time of from about 0.25 to about 10 hours, to form a solid catalytic material of greater structural strength than that of the original calcined composite of pyrophosphoric acid and diatomaceous earth.

12. A process which comprises treating a calcined composite of pyrophosphoric acid and diatomaceous earth with an amount of an aluminum trialkyl sufficient to add from about 1 to about 10% by weight of aluminum phosphate to said calcined composite, and further calcining the resultant composite at a temperature of from about 100° C. to about 550° C. for a time of from about 0.25 to about 10 hours, to form a solid catalytic material of greater structural strength than that of the original calcined composite of pyrophosphoric acid and diatomaceous earth.

13. A process which comprises treating a calcined composite of pyrophosphoric acid and diatomaceous earth with an amount of an aluminum trihalide sufficient to add from about 1 to about 10% by weight of aluminum phosphate to said calcined composite, and further calcining the resultant composite at a temperature of from about 100° C. to about 550° C., for a time of from about 0.25 to about 10 hours, to form a solid catalytic material of greater structural strength than that of the original calcined composite of pyrophosphoric acid and diatomaceous earth.

14. A process which comprises treating a calcined composite of a phosphoric acid and a solid supporting material with an organo aluminum compound reactable with free phosphoric acid in said composite and in an amount sufficient to add from about 1 to about 10% by weight of aluminum phosphate to said calcined composite, and further calcining the resultant composite at a temperature of from about 100° C. to about 550° C. to form a solid catalytic material of greater structural strength than that of the original calcined composite of phosphoric acid and solid supporting material.

15. A process for increasing the structural strength of a calcined composite of a phosphoric acid and a solid supporting material which comprises treating said composite with an organo aluminum compound reactable with free phosphoric acid in said composite and in sufficient amount to add from about 1% to about 10% by weight of aluminum phosphate to the composite, and calcining the thus treated composite.

16. A solid catalytic material formed by treating a precalcined composite of a phosphoric acid and a solid supporting material with an organo aluminum compound reactable with free phosphoric acid in said composite and in sufficient amount to add from about 1% to about 10% by weight of aluminum phosphate to the composite, and calcining the thus treated composite.

17. A process which comprises treating a calcined composite of a phosphoric acid and a solid supporting material with boron trifluoride in an amount sufficient to add from about 1 to about 10% by weight of boron phosphate to said calcined composite, and further calcining the resultant composite at a temperature of from about 100° C. to about 550° C. to form a solid catalytic material of greater structural strength than that of the original calcined composite of phosphoric acid and solid supporting material.

18. A process which comprises treating a calcined composite of a phosphoric acid and a solid supporting material with boron trichloride in an amount sufficient to add from about 1 to about 10% by weight of boron phosphate to said calcined composite, and further calcining the resultant composite at a temperature of from about 100° C. to about 550° C. to form a solid catalytic material of greater structural strength than that of the original calcined composite of phosphoric acid and solid supporting material.

JULIAN M. MAVITY.

No references cited.